(12) United States Patent
McLaughlin

(10) Patent No.: US 6,966,567 B2
(45) Date of Patent: Nov. 22, 2005

(54) ONE END ADJUSTABLE TORQUE ROD

(75) Inventor: Ronald J. McLaughlin, Maumee, OH (US)

(73) Assignee: The Pullman Company, Milan, OH (US)

( * ) Notice: Subject to any disclaimer, the term of this patent is extended or adjusted under 35 U.S.C. 154(b) by 0 days.

(21) Appl. No.: 10/435,155

(22) Filed: May 9, 2003

(65) Prior Publication Data

US 2004/0222610 A1 Nov. 11, 2004

(51) Int. Cl.$^7$ ................................................. B62D 7/20
(52) U.S. Cl. ...................... 280/93.51; 74/579; 74/586; 403/43; 403/46; 403/47
(58) Field of Search ......................... 280/43.21, 43.22, 280/86.757, 124.154, 86.75, 124.128, 124.134, 280/124.153, 124.116, 93.502, 93.501; 180/352, 180/349; 74/579 R, 586, 579; 403/43, 44, 403/46, 47

(56) References Cited

U.S. PATENT DOCUMENTS

| | | | | |
|---|---|---|---|---|
| 2,115,915 A | * | 5/1938 | McCain | ................. 280/86.757 |
| 3,721,134 A | * | 3/1973 | Lamke | ......................... 74/586 |
| 3,837,753 A | * | 9/1974 | Weiste et al. | ................. 403/33 |
| 4,012,967 A | * | 3/1977 | Warren | ......................... 74/586 |
| 4,295,389 A | * | 10/1981 | Geisthoff et al. | ............. 74/586 |
| 4,757,058 A | * | 7/1988 | Kruger et al. | ............... 514/112 |
| 5,121,808 A | * | 6/1992 | Visentini et al. | ............ 180/435 |
| 5,505,106 A | * | 4/1996 | Herman | ....................... 74/586 |
| 5,522,281 A | * | 6/1996 | Herman | ....................... 74/586 |
| 5,564,521 A | | 10/1996 | McLaughlin et al. | |
| 5,702,196 A | * | 12/1997 | Petercsak | ..................... 403/46 |
| 5,791,679 A | | 8/1998 | McLaughlin | |
| 5,885,688 A | | 3/1999 | McLaughlin | |
| 6,231,264 B1 | | 5/2001 | McLaughlin et al. | |
| 6,267,526 B1 | * | 7/2001 | McLaughlin | ................ 403/150 |
| 6,270,282 B1 | | 8/2001 | McLaughlin | |
| 6,699,082 B2 | * | 3/2004 | Zeiger | ......................... 440/63 |

\* cited by examiner

Primary Examiner—Paul N. Dickson
Assistant Examiner—Toan To
(74) Attorney, Agent, or Firm—Harness, Dickey & Pierce, PLC

(57) ABSTRACT

A length adjustment system for a torque rod assembly includes a tubular rod attached to one joint assembly and a solid rod attached to another joint assembly. The solid rod extends into the tubular rod. An adjustment nut attached to the tubular rod threadingly receives the solid rod and rotation of the adjustment nut adjusts the length of the torque rod assembly. The length adjustment system can be incorporated into a straight torque rod assembly or into a V-configuration torque rod assembly.

20 Claims, 3 Drawing Sheets

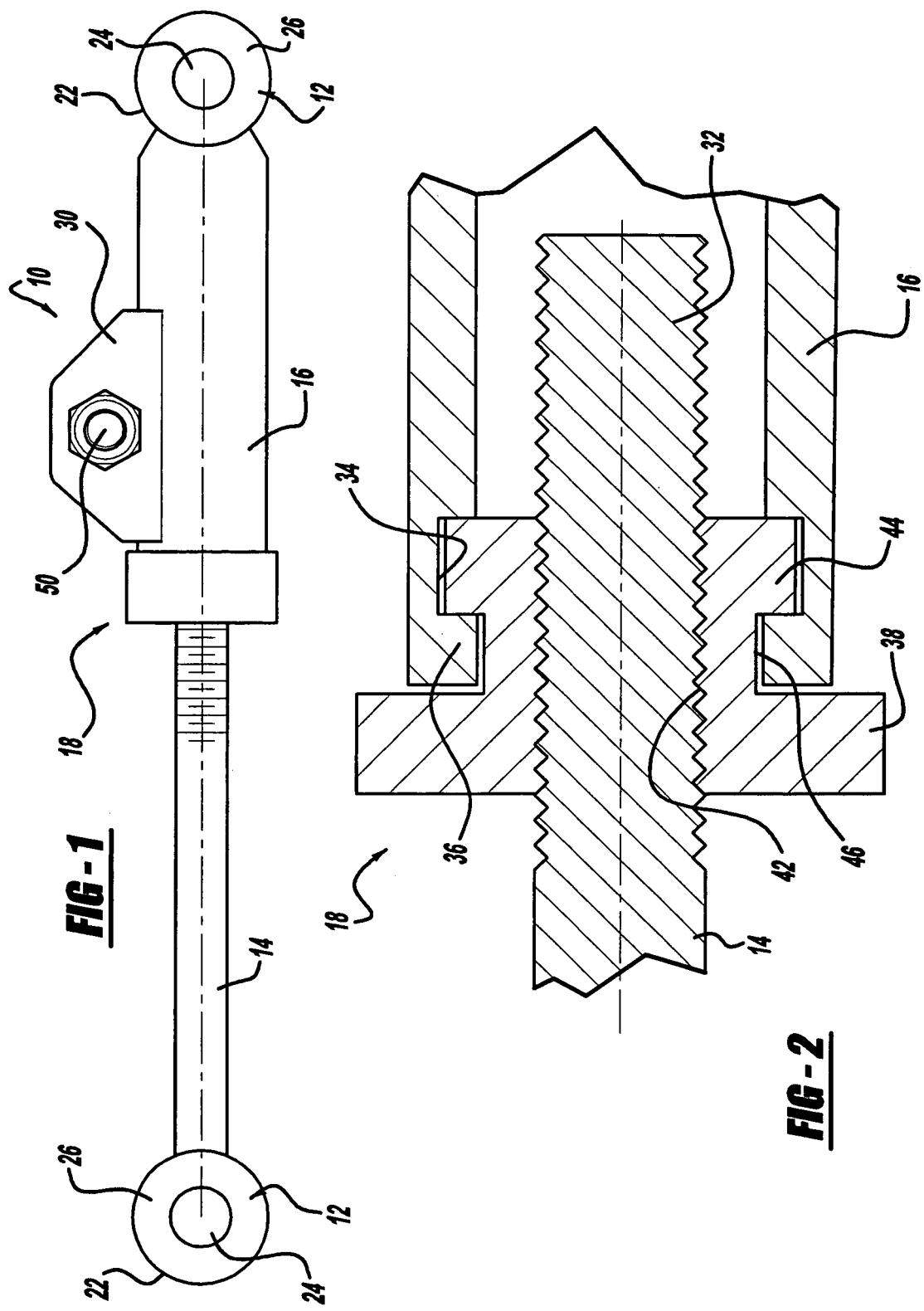

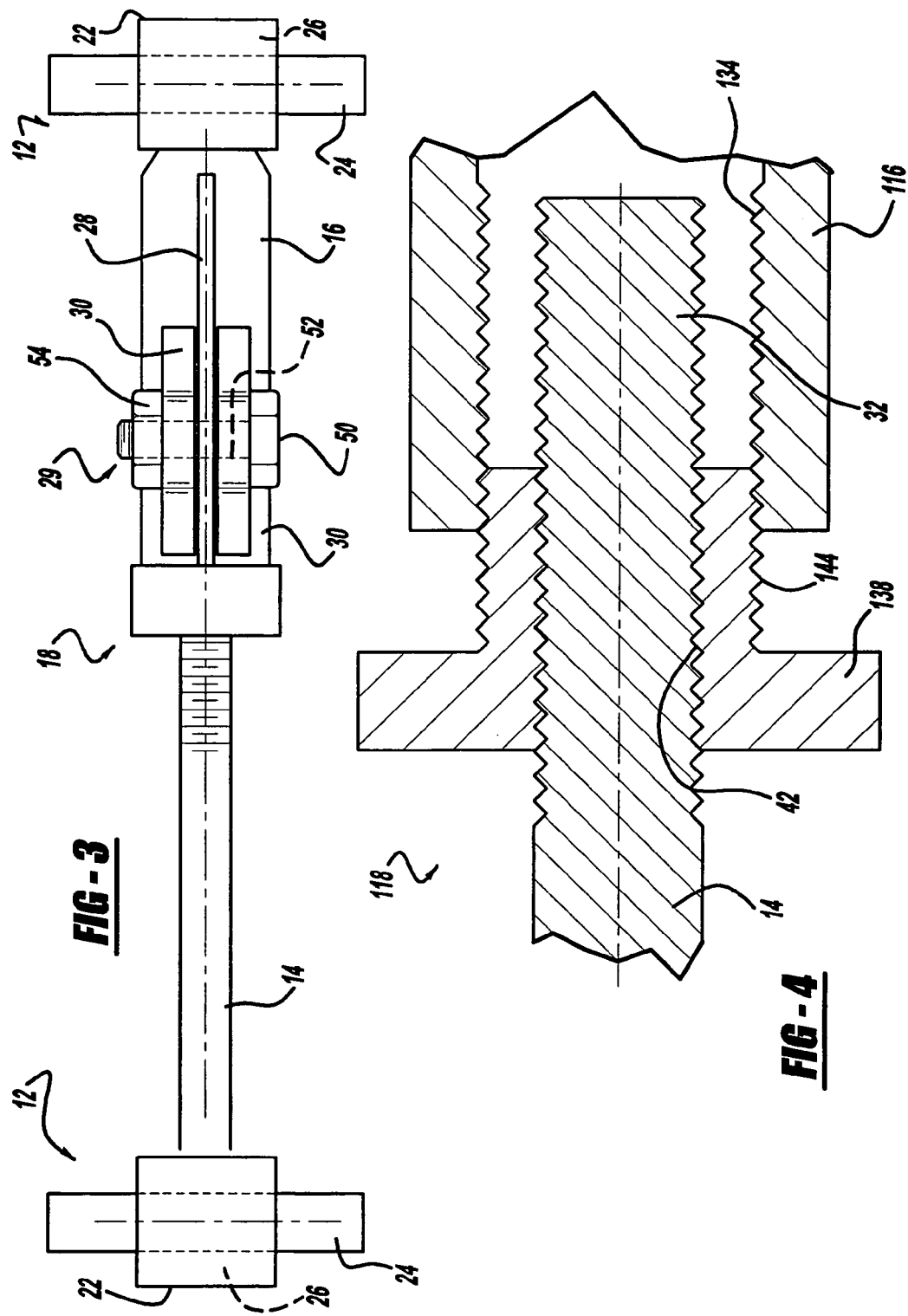

ONE END ADJUSTABLE TORQUE ROD

FIELD OF THE INVENTION

The present invention related to torque rod assemblies for use in suspension system for trucks, buses and the like. More particularly, the present invention is related to an improved adjustable length torque rod for the torque rod assemblies.

BACKGROUND OF THE INVENTION

Truck and bus suspensions utilize at least one torque rod assembly to secure the drive axle to the vehicle's frame. The securing of the drive axle to the vehicle's frame by the torque rod assembly maintains the drive axle's alignment to the vehicle's frame, it maintains the proper suspension geometry for the vehicle, and it allows fore suspension movement in both jounce and rebound for all terrain, road and driving conditions. Because of the wide range of dynamic operating conditions for these vehicles, especially heavy duty trucks, the severe impact loads to the suspension system combined with the road induced vibrations on the suspension system lead to deleterious effect on the individual suspension components including the torque rod assemblies as well as having a negative impact on the operator's physical fatigue condition. These severe dynamic conditions can accelerate wear of the torque rod assemblies of the suspension system leading to premature deterioration of these torque rod assemblies.

As described above, the purpose of torque rod assemblies on large vehicles is to stabilize the axle. They prevent the axle from rotating about its own axis, they prevent the axle from moving fore and aft during braking and acceleration, and they prevent axle yaw. While there are a variety of suspension designs, one of two approaches are generally used to stabilize the axle. The first approach uses straight torque rod assemblies which have a center torque rod and pivotal joints at either end. Two of these straight rods are typically mounted fore and aft on the vehicle, where one end is mounted to the axle and the other end is mounted to the frame. An additional straight torque rod assembly is similarly mounted laterally in the vehicle, generally perpendicular to other torque rod assemblies. The second approach is to incorporate a V-configuration torque rod assembly. This type of torque rod assembly has pivotal joints at the apex of the V as well as at the end of each leg. The apex is typically mounted to the axle and the legs are then mounted to the frame. The V-configuration torque rod assemblies control both fore and aft movement as well as lateral movement. The major advantage to the V-configuration torque rod assembly is axle stability.

A typical prior art straight torque rod assembly or V-configuration torque rod assembly is comprised of two or three pivotal joint eyelet forgings rigidly connected to each other with a center torque rod to provide mechanical integrity. The center torque rod can be a solid or tubular rod. The eyelets and the center rod form a natural path for shock and vibration energy to transfer from the suspension system into the frame, the cab and other areas of the sprung mass of the vehicle. In order to isolate this path, an isolation function has been incorporated into a pivotal joint assembly mated with each eyelet. This isolation function thus makes the pivotal joint assembly a critical multi-functional component for the torque rod assembly as well as the suspension system as a whole.

Due to tolerance stack ups and other variations encountered during the assembly of the vehicle, it is sometimes desirable to provide adjustability to the center torque rod of the torque rod assembly. A typical prior art adjustable torque rod assembly 200 is illustrated in FIG. 6.

Torque rod assembly 200 comprises a pair of pivotal joint assemblies 202, a solid rod 204, a solid rod 206 and an attachment clamp 208. Each solid rod 204 and 206 include an enlarged section 210 which is headed on the ends of rods 204 and 206 and enlarged section 210 is welded to a respective eyelet 212 of pivotal joint assembly 202.

Attachment clamp 208 comprises a tubular housing 222 having a pair of radially extending ears 224. Solid rod 204 defines a threaded end 226 and solid rod 206 defines a threaded end 228. Tubular housing 222 defines a threaded bore 230 into which threaded end 226 of solid rod 204 and threaded end 228 of solid rod 206 are assembled. Once the appropriate engagement length between threaded end 226 and bore 230, the appropriate engagement length between threaded end 228 and bore 230 and thus the appropriate length of torque rod assembly 200 is set, a pair of bolts 232 are inserted through ears 224 and a pair of nuts 234 are threaded onto bolts 232. Nuts 234 are tightened to secure the attachment of clamp 208.

While the above described design for an adjustable length torque rod assembly has performed satisfactorily in the various suspensions, there are several issues that need to be addressed with regards to this design. First, the number of components that are needed for this design are excessive. This leads to excessive costs, inventory problems and logistics problems throughout the manufacturing process. Second, the assembly of the above design design is labor intensive which leads to excessive costs during the assembly of the system.

SUMMARY OF THE INVENTION

The present invention provides the art with a simplified lower cost torque rod assembly which is adjustable in length. In one embodiment, one center torque rod is comprised of two rods where one of the rods is solid with a threaded end and the other rod is tubular. An adjustment nut is rotatably secured to the tubular rod and it threadingly receives the threaded end of the solid rod to provide for the adjustability. In another embodiment, the center torque rod is comprised of two pieces where one of the rods is solid with a threaded end and the other rod is tubular with an internal thread. An adjustment nut threadingly receives both of the threaded portions of the two rods to provide for the adjustability.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a side view of a straight torque rod assembly incorporating the adjustment mechanism in accordance with the present invention.

FIG. 2 is an enlarged cross-sectional view of the adjustment mechanism illustrated in FIG. 1;

FIG. 3 is plan view of the straight torque rod assembly illustrated in FIG. 1.

FIG. 4 is an enlarged cross-sectional view illustrating an adjustment mechanism in accordance with the present invention.

DETAILED DESCRIPTION OF THE PREFERRED EMBODIMENTS

Figure 5:
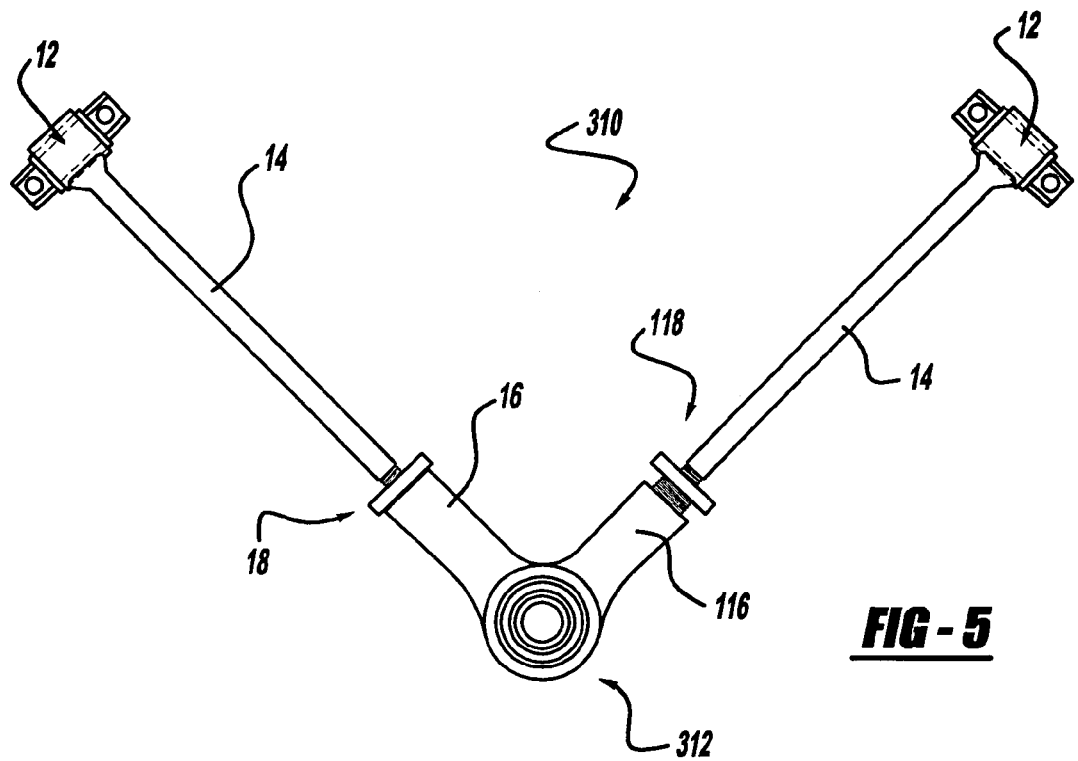
FIG. 5 is a plan view of a V-configuration torque rod assembly incorporating the adjustment mechanisms illustrated in FIGS. 2 and 4.
Figure 6:
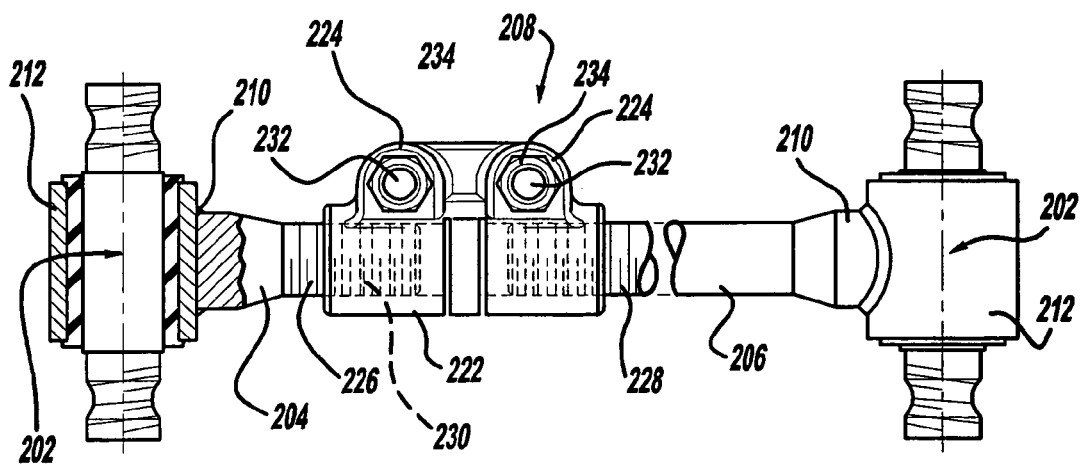
FIG. 6 is a plan view of a straight torque rod assembly incorporating the adjustment mechanism of the prior art.

The following description of the preferred embodiment(s) is merely exemplary in nature and is in no way intended to limit the invention, its application, or uses.

There is illustrated in FIG. 1, a straight torque rod assembly which incorporates a unique adjustment mechanism in accordance with the present invention and which is designated generally by reference numeral 10. Torque rod assembly 10 comprises a pair of pivotal joint assemblies 12, a solid center rod 14, a tubular center rod 16 and an adjustment mechanism 18.

Each pivotal joint assembly 12 comprises an eyelet 22, a center connection bar 24 and an elastomeric bushing 26 disposed between eyelet 22 and center connection bar 24. One pivot joint assembly 12 is secured to solid center rod 14 by having a respective eyelet 22 welded to or otherwise secured to solid center rod 14. The other pivot joint assembly 12 is secured to tubular rod 16 by having a respective eyelet 22 welded to or otherwise secured to tubular center rod 16. Once assembled, one connection bar 24 is secured to a bracket attached to the frame or other structure of the sprung mass of the vehicle and the opposite connection bar 24 is secured to a bracket attached to the axle assembly or other structure of the unsprung mass of the vehicle.

Tubular center rod 16 defines an axially extending slot 28 and a pair of radially extending flanges 30. Slot 28 and flanges 30 are utilized to secure tubular center rod 16 after adjustment has been made to the length of torque rod assembly 10 as described below.

Referring now to FIG. 2, adjustment mechanism 18 comprises an external threaded portion 32 of solid center rod 14, a retaining groove 34 and an annular flange 36 formed into tubular center rod 16 and an adjustment nut 38.

Adjustment nut 38 defines an internal thread 42 which threadingly receives external threaded portion 32 of solid center rod 14. Adjustment nut 38 also defines an annular flange 44 which is received within retaining groove 34 and an annular groove 46 which receives annular flange 36 to secure adjustment nut 38 to tubular center rod 16. Tubular center rod 16 is manufactured with an open groove (not shown) which eventually becomes retaining groove 34. Adjustment nut 38 is positioned within the open groove 34 and to open end of tubular center rod 16 is formed over to create and dispose annular flange 36 within groove 464 while simultaneously forming retaining groove 34 trapping annular flange 44 of adjustment nut 38 within groove 34. Adjustment nut 38 is free to rotate with respect to tubular center rod 16 but is cannot move axially with respect to tubular center rod 16 due to the engagement of annular flanges 36 and 44 with grooves 46 and 34, respectively.

Adjustment in length for torque rod assembly 10 can be accomplished either before or after torque rod assembly 10 is assembled to a vehicle. If torque rod assembly 10 is not attached to the vehicle, adjustment can be made by securing solid center rod 14 and rotating adjustment nut 38 with respect to tubular center rod 16 or by securing adjustment nut 38 and rotating solid center rod 14. Once assembled into the vehicle, adjustment can only be accomplished by rotating adjustment nut 38 which adjust the length of torque rod assembly 10 because both center rods 14 and 16 are prohibited from rotation due to their connection to the vehicle.

Once torque rod assembly 10 has been assembled to the vehicle and adjustment nut 38 has been rotated to provide for the final adjustment of the length of torque rod assembly 10, adjustment nut 38 is locked to tubular center rod 16 utilizing slot 28 and flanges 30. A bolt 50 is assembled through a bore 52 defined by each flange 30. A nut 54 is assembled to bolt 50 an as nut 54 is tightened, flanges 30 are forced towards each other to reduce the size of slot 28 therefore securing adjustment nut 38 to tubular center rod 16 by prohibiting rotation of adjustment nut 38 with respect to tubular center rod 16. While slot 28 and flanges 30 acting as a clamp assembly 29 are illustrated as a means for locking the length of torque rod assembly 10, other means known in the art can be used such as, but not limited to, forming tubular center rod 16 to secure adjustment nut 38 or prohibiting rotation of adjustment nut 38 with respect to solid center rod 14 or tubular center rod 16 by using various thread locking system or rotation prevention systems known in the art.

Referring now to FIG. 4, an adjustment mechanism in accordance with another embodiment of the present invention is illustrated and is referenced generally by the reference numeral 118. Adjustment mechanism 118 comprises external threaded portion 32 of solid center bar 14, and internal threaded portion 134 formed into a tubular center rod 116 and an adjustment nut 138.

Tubular center rod 116 is the same as tubular center rod 16 except that groove 34 and flange 36 of tubular center rod 16 have been replaced by internal threaded portion 134. Tubular center rod 116 defines slot 28, the pair of flanges 30 and tubular center rod 116 is secured to a respective eyelet 22, the same as tubular center rod 16.

Adjustment nut 138 defines internal thread 42 which threadingly receives external threaded portion 32 of solid center rod 14. Adjustment nut 38 also defines an external thread 144 which is threadingly received by internal threaded portion 134 of tubular center rod 116. Adjustment nut 138 is free to rotate with respect to both solid center rod 14 and tubular center rod 116.

Adjustment in length for torque rod assembly 110 can be accomplished either before or after torque rod assembly 110 is assembled to a vehicle. If torque rod assembly 110 is not attached to the vehicle, adjustment can be made by rotating adjustment nut 138 with respect to either or both center rods 14 and 116 or by rotating either or both center rods 14 or 116 with respect to adjustment nut 138. Once assembled to the vehicle, adjustment can only be accomplished by rotating adjustment nut 138 with respect to center rods 14 and 116. Rotation of adjustment nut 138 with respect to center rods 14 and 116 causes center rods 14 and 116 to move in opposite axial directions due to the designs for threaded portion 32, internal thread 42, internal thread portion 134 and external thread 144.

Once torque rod assembly 110 has been assembled into the vehicle and adjustment nut 138 has been rotated to provide for the final adjustment of the length of torque rod assembly 110, adjustment nut 138 is locked to tubular center rod 116 utilizing slot 28, flanges 30, bolt 50 and nut 54 in the same manner described above for adjustment nut 38. Other means known in the art can be used to secure adjustment nut 138 such as, but not limited to, forming tubular center rod 116 to secure adjustment nut 138 or prohibiting rotation of adjustment nut 138 with respect to solid center rod 14 or tubular center rod 116 by using various thread locking system or rotation prevention systems known in the art.

Referring now to FIG. 5, a V-configuration torque rod assembly fifteen illustrated and is referenced generally by reference numeral 310. V-configuration torque rod assembly 310 comprises an apex pivotal joint assembly 312, a pair of end pivotal joint assemblies 12, a first solid center rod 14, tubular center rod 16, adjustment mechanism 18, a second solid center rod 14, tubular center rod 116 and adjustment mechanism 118. While V-configuration torque rod assembly 310 includes both adjustment mechanism 18 and adjustment mechanism 118, typically a V-configuration torque rod assembly will have a pair of adjustment mechanisms 18 or a pair of adjustment mechanisms 118. The incorporation of both adjustment mechanism 18 and adjustment mechanism 118 on the same V-configuration torque rod assembly is being done as a matter of convenience to illustrate the adapt ability of the present invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A torque rod assembly comprising:
   a first joint assembly;
   a first solid rod fixedly secured to said first joint assembly, said first solid rod defining a threaded end;
   a second joint assembly;
   a first tubular rod fixedly secured to said second joint assembly, said first solid rod being disposed within said first tubular rod;
   a first adjustment nut rotatably secured to said first tubular rod, said first adjustment nut threadingly receiving said threaded end of first solid rod for providing length adjustment for said torque rod assembly, a clamp assembly secured to said first tubular rod for locking rotation of said first adjustment nut.

2. The torque rod assembly according to claim 1 wherein said first adjustment nut is threadingly received by said first tubular rod.

3. The torque rod assembly according to claim 2 wherein said first tubular rod defines an axially extending slot.

4. The torque rod assembly according to claim 3 wherein said clamp assembly comprises a pair of flanges extending radially from said first tubular rod.

5. The torque rod assembly according to claim 1 wherein said first tubular rod defines an axially extending slot.

6. The torque rod assembly according to claim 1 wherein said first adjustment nut defines an annular groove and said first tubular rod defines an annular flange disposed within said annular groove defined by said first adjustment nut.

7. The torque rod assembly according to claim 6 wherein said first tubular rod defines an annular groove and said first adjustment nut defines an annular flange disposed within said annular groove defined by said first tubular rod.

8. The torque rod assembly according to claim 6 wherein said first tubular rod defines an axially extending slot.

9. The torque rod assembly according to claim 8 wherein said clamp assembly comprises a pair of flanges extending radially from said first tubular rod.

10. The torque rod assembly according to claim 6 wherein said first tubular rod defines an axially extending slot.

11. The torque rod assembly according to claim 1 wherein said torque rod assembly further comprises:
    a third joint assembly;
    a second solid rod extending from said third joint assembly;
    a second tubular rod extending from said second joint assembly, said second solid rod being disposed within said second tubular rod; and
    a second adjustment nut attached to said second tubular rod, said second adjustment nut threadingly receiving said second solid rod for providing length adjustment for said torque rod assembly.

12. The torque rod assembly according to claim 11 wherein said first adjustment nut is threadingly received by said first tubular rod and said second adjustment nut is threadingly received by said second tubular rod.

13. The torque rod assembly according to claim 12 wherein said first tubular rod defines a first axially extending slot and said second tubular rod defines a second axially extending slot.

14. The torque rod assembly according to claim 11 wherein
    one of said first adjustment nut and said first tubular rod defines a first annular groove and the other of said first adjustment nut and said first tubular rod defines a first annular flange disposed within said first annular groove; and
    one of said second adjustment nut and said second tubular rod defines a second annular groove and the other of said second adjustment nut and said second tubular rod defines a second annular flange disposed within said second annular groove.

15. The torque rod assembly according to claim 14 wherein said first tubular rod defines a first axially extending slot and said second tubular rod defines a second axially extending slot.

16. The torque rod assembly according to claim 1 wherein said torque rod assembly further comprises
    a third joint assembly;
    a second tubular rod extending from said third joint assembly;
    a second solid rod extending from said first joint assembly, said second solid rod being disposed within said second tubular rod; and
    a second adjustment nut attached to said second tubular rod, said second adjustment nut threadingly receiving said second solid rod for providing length adjustment for said torque rod assembly.

17. The torque rod assembly according to claim 16 wherein said first adjustment nut is threadingly received by said first tubular rod and said second adjustment nut is threadingly received by said second tubular rod.

18. The torque rod assembly according to claim 16 wherein said first tubular rod defines a first axially extending slot and said second tubular rod defines a second axially extending slot.

19. The torque rod assembly according to claim 16 wherein
    one of said first adjustment nut and said first tubular rod defines a first annular groove and the other of said first adjustment nut and said first tubular rod defines a first annular flange dispose within said first annular groove; and
    one of said second adjustment nut and said second tubular rod defines a second annular groove and the other of said second adjustment nut and said second tubular rod defines a second annular flange disposed within said second annular groove.

20. The torque rod assembly according to claim 19 wherein said first tubular rod defines a first axially extending slot and said second tubular rod defines a second axially extending slot.

* * * * *